April 28, 1931.  J. H. COPE  1,802,594
PUSH-OFF DEVICE FOR HAY RAKES
Filed Nov. 19, 1921  2 Sheets-Sheet 2
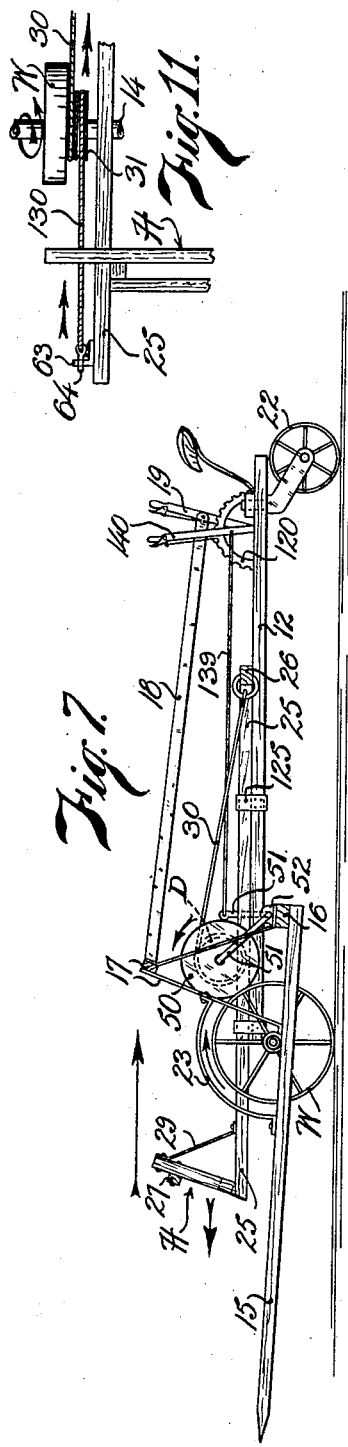
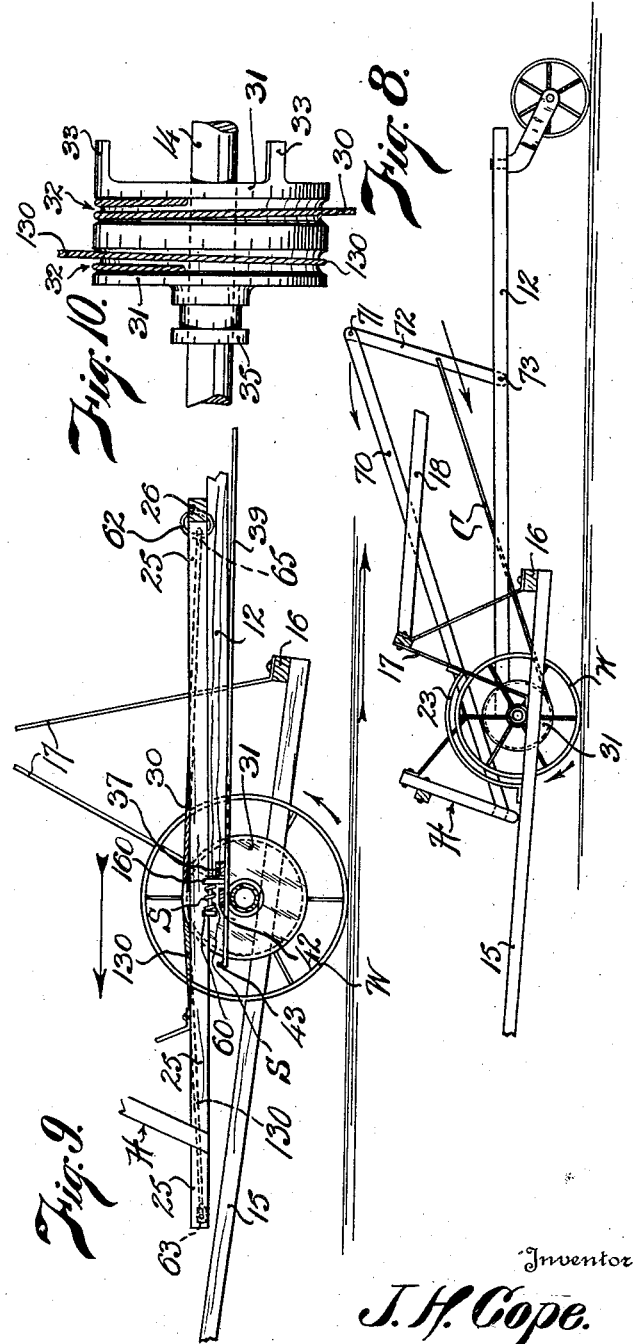
Inventor
J. H. Cope.
By Lynn L. Steele
Attorney Patented Apr. 28, 1931

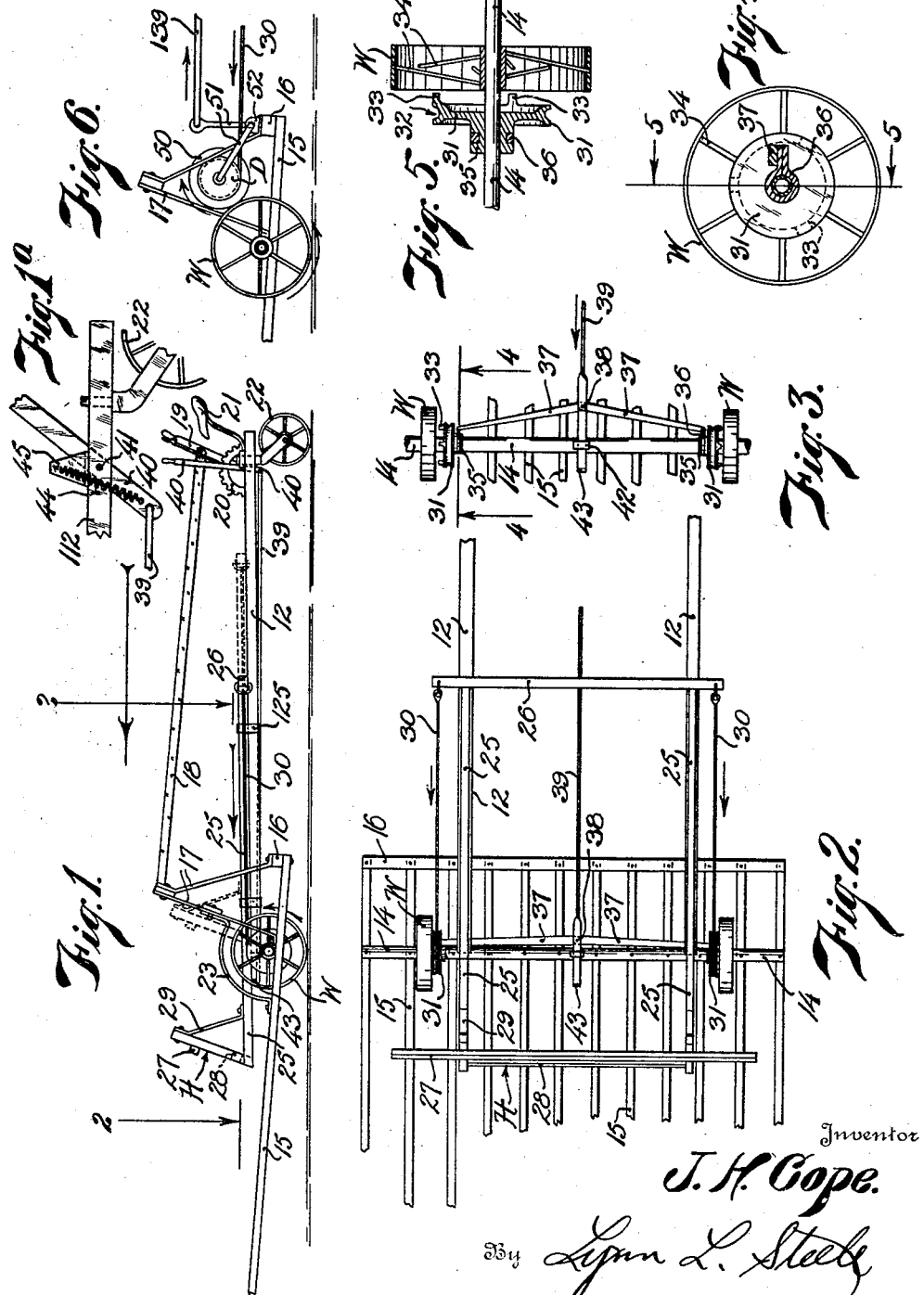

1,802,594

UNITED STATES PATENT OFFICE

JOSEPH H. COPE, OF DENVER, COLORADO

PUSH-OFF DEVICE FOR HAY RAKES

Application filed November 19, 1921. Serial No. 516,314.

The object of the invention is to provide a device for use on hay rakes, more particularly of the push-rake type, by means of which a load of hay thereon may be pushed from the rake positively when it is desired to discharge the same, which device shall be easily operable and largely automatic.

Briefly, the invention comprises a push bar or head which overlies the teeth of the rake and has operative connection with the ground wheels thereof so that the head, which is herein called a push-off, may be projected forward to discharge the load during forward movement of the wheels and the rake, whenever discharge is desired. Preferably, the connection comprises a projection tongue or plunger mechanism operable by means, such as cables and drums, adapted to be thrown into engagement with the ground wheels of the rake whereby the traction of the wheels operates the parts and the push-off head is driven forward.

In the drawings, wherein certain embodiments of the invention are disclosed by way of illustration, Fig. 1 is a side elevation of a rake equipped with one form of the invention;

Fig. 1a is an elevational detail;

Fig. 2 is a plan of a part of Fig. 1 taken from line 2—2;

Fig. 3 is a fragmentary plan showing a different position;

Fig. 4 is a section taken on line 4—4 of Fig. 3;

Fig. 5 is a section taken on line 5—5 of Fig. 4;

Fig. 6 is an elevational detail of a modified form;

Fig. 7 is an elevation of a slightly different form;

Fig. 8 is an elevation of a further modification;

Fig. 9 is a slight modification of the form of Fig. 1, and

Fig. 10 is a detail of the drum construction used thereon,

Fig. 11 being a fragmentary plan of this form.

A sweep rake of conventional type is indicated in the drawings in a general way. This comprises the push beams 12 whose forward ends are mounted on an axle 14, and a series of rake teeth 15 also carried by said axle and having a rear cross bar 16 which assists the teeth in carrying the braced rake back as indicated at 17. A lifting bar 18 is connected with the top of said back and extends rearward to a lever 19 cooperating with a quadrant for raising and lowering the forward ends of the rake teeth 15. The quadrant 20, a seat 21 and a caster wheel 22 are carried by the beams 12. The axle 14 is provided with ground wheels W over which guards 23 are positioned.

The push-off device in this form is composed of a pair of plungers 25 slidable upon the beams 12 and maintained in position by means of retainers 125 secured as indicated. The rear ends of the plungers or projection tongues 25 are connected by means of a cross bar 26, while their forward ends carry a push-off head H. The head H includes a short lower bar to pass between the wheels W and indicated at 28, a longer bar 27 which overhangs the wheels when in rearmost position, and suitable braces 29.

The push-off is drawn forward by means of cables 30 which may be connected with cross bar 26 as by means of rings shown, and which leads forward to drums 31 journaled on the axle 14. Each drum 31 is provided with a groove 32 to receive the cable and with projecting fingers 33 adapted to engage the spokes 34 of the adjacent wheel W. Each drum also has an elongated hub 35 to provide a stable bearing, and the hub is grooved to receive a shifting yoke 36 operable by means of a toggle comprising laterally directed bars 37 pivoted at 38 to a longitudinally disposed operating rod 39. Rod 39 extends rearward and is connected with the lower end of a lever 40 pivoted at 41 to some part of the framework, while its forward end projects through a guide 42 and has an upstanding lug 43 on its tip to prevent withdrawal from the guide 42. A spring 44 is provided for drawing the lever 40 to the limit of its movement in either direction after it passes dead center, and for retaining it in such position. This spring is connected at one end to the lever below pivot 41 and at the other end to some point on the opposite side of the pivot such as a bracket 45 carried by that portion 112 of the frame work on which the lever is mounted. In the form shown in Figs. 1, 2 and 3, the head H is returned to original position by the pressure of a new load when the rake is being driven under the same. The withdrawn position of the toggle members 37, 39 is shown in Fig. 3. Fig. 2 shows the parts in a position just a little short of full engagement of the drums 31 with the wheels; a little further movement will carry the pivot point 38 beyond dead center so as to insure retention of the parts in driving relation during movement.

The modification of Figs. 9, 10 and 11 provides for automatic return of the head H to original position as the wheels W revolve backward in backing the rake away from the point of discharge, and for automatic release of the drums from the wheels at the end of the return movement. Here, each drum 31 is provided with two grooves 32; one groove carries the cable 30 which leads rearward to the cross bar 26, and the other groove receives a second cable 130 which leads forward to a bracket 63 on an extension of the adjacent plunger 25 lying beyond the head H. Thus, when one cable is wound onto the drum, the other is unwound, so that the head is positively moved in one direction or the other. On the return movement, the back of the head H strikes a stop or projection 60 carried by the rod 39 and moves the latter rearward causing the bars 37 to withdraw the drums 31 from engagement with the wheels. This stop is preferably mounted on a lug 160 fixed on the rod 39, by means of a stem slidable in said lug, and is controlled by a stiff spring S. The tension of spring S is heavy enough to transmit movement from the head H on the return stroke to the rod 39 for withdrawing the drums 31. On the other hand, when the rake is loaded and the head H is in retracted position, the spring S will yield to permit rod 39 to be driven forward by lever 40 for carrying drums 31 into driving position; the operator holds the parts in this position until the load has started forward and the spring S is relieved.

The push-off of these forms is indicated as being driven forward during forward movement of the rake. However, movement of the head forward might take place upon movement of the rake backward, and means is provided in the form of Figs. 9, 10 and 11 to accomplish this result. Here, it is merely necessary to interchange the connections on the ends of the cables 30 and 130. Cable 30 is connected to bar 26 at the rear of the push-off by means of a ring 62 on the bar and a hook 65 on the end of the cable, and each cable 130 is connected to the bracket 63 on the extension of the respective plunger 25 by means of a hook 64. By interchanging these hooks 64 and 65 so that the cables lead off from the under side of the drums 31, instead of from the top, the push-off will be driven forward when the rake is backed.

In the type indicated in Figs. 6 and 7, a weighted roller 50 is employed for engagement with each carrier wheel W, and the roller is provided with a drum D like drums 31 for receiving the cable 30. Fig. 6 differs from Fig. 7, in that the cable is so wound on the drum D that the push-off will move forward when the rake moves forward, whereas in Fig. 7 the cable is oppositely wound so that the push-off H will move forward when the rake moves rearward. In each case the roller 50 is carried on a bell crank 51 mounted in a bearing 52 on the cross bar 16 at the rear of the teeth 15. A rod 139 which operates the bell crank leads rearward to a lever 140 cooperating with a quadrant 120 for positively retaining the roller either in or out of driving engagement with the respective carrier wheel W.

In the form of Fig. 8, the push-off head H rests upon the rake teeth 15 and is operated by plungers 70 pivoted at 71 to the upper end of a lever 72 pivoted at 73 on each of the rake beams 12. Drums 31 are provided for engagement with the spokes of the carrier wheels W as in the other forms and may be operated in the same manner. Cables C lead from the drums to intermediate points of the levers 72, whereby a rapid forward movement is given the push-off as the rake is backed. Obviously, by reversing the cables on the drums, forward movement of the rake would produce forward movement of the push-off.

In using the device, the rake teeth are pushed forward under a load in the usual manner and the forward ends of the teeth 15 lifted by drawing back bar 18 and lever 19 as usual. The rake is then moved forward by the team toward the unloading point, and, either with the form of Figs. 1, 2 and 3 or that of Figs. 9, 10 and 11, as the rake approaches that point the rod 39 is thrust forward to drive the drums 31 into engagement with the carrier wheels W whereby the cables 30 are wound on the drums and the push-off head H is positively driven forward through the influence of the movement of the rake and is thereby pushed against the load to dislodge and push the same forward along the rake teeth. Either, the parts may be so proportioned, or the throwing of the drums into engagement with the carrier wheels may be so timed, that the load is either partially or totally discharged from the teeth 15 as desired. Where the load is being discharged onto the teeth of a haystacker, for instance, it may be desired to move the push-off forward for only a partial discharge of the load from the rake teeth, the rake teeth being lowered between the stacker teeth so as to transfer the load to the latter. This transfer may be either partial or complete, but in either event when the rake is backed away the load is left entirely on the stacker teeth. Again, the push-off may be driven all the way forward on the rake teeth to force the load well up on the stacker teeth and pack it against the back members of the stacker head without making it necessary to drive the rake teeth entirely up on the stacker teeth, as heretofore.

Where the term "discharge" is used herein it is not intended to be limited to either partial or total discharge unless specified.

In the case of Fig. 1 the push-off will be returned when a new load is taken, and in that of Fig. 9 it will be automatically returned by cables 130 as the rake is backed away, the drums 31 being released by engagement of head H with stop 60. The operation of the other forms is similar, except that in those shown in Figs. 7 and 8 the driving parts will not be thrown into engagement with the carrier wheels W until the rake is ready to be backed away from the place of discharge, so that the push-off will advance as the rake is backed. This will be true also when the cable connections of Fig. 9 are interchanged to cause the push-off H to move forward when the rake backs. Obviously, in this last instance the push-off will be returned to original position by movement of the rake forward.

From the foregoing it will be seen that the full power of the team (or other prime mover) is applied direct to the load, and the latter is positively driven or propelled forward by the push-off as distinguished from mere holding or retaining of the load, as where the rake is backed away and the load held against backward movement with the rake by some device which is thrust into the ground and thereby made stationary. Thus a positive drive is placed behind the push-off and the latter is positively pushed against the load to dislodge the same. Thus, the load is thrust forward against whatever load is already carried by the stacker head, thereby packing the dislodged load firmly against said load on the stacker head. The farther the push-off moves forward on the rake teeth, the more firmly is the dislodged load packed and the less the rake teeth penetrate the load on the stacker head. If the push-off is moved forward entirely to the end of the rake teeth, there is no penetration of said teeth into any part of either load when the rake is backed away.

I claim:

1. A push-rake, a push-off thereon, a connection to drive the push-off forward automatically by movement of the rake as the rake moves forward, and means to render said connection operative.

2. A method for piling hay and the like comprising establishing a primary pile, placing another quantity of hay upon a vehicle, moving the vehicle forward to bring said quantity of hay into contact with the primary pile, and pushing said quantity of hay forward from said vehicle against the primary pile as the vehicle moves forward to pack said quantity against said pile.

3. A vehicle, a push-off thereon, and a driving connection between the vehicle and the push-off whereby forward movement of the vehicle drives the push-off forward relatively to the vehicle.

4. A vehicle having wheels, a push-off thereon, means to move the push-off forward by the traction of the wheels as the vehicle moves forward.

5. A push-rake having a push-off thereon and a driving connection, means to move said connection into operative position, and means between the connection and the push-off to move the push-off forward with respect to the rake as the rake moves forward.

6. A vehicle having a wheel, a push-off on the vehicle and adapted to be moved forward, a connection adapted to engage the wheel and means between the connection and the push-off to drive the push-off forward as the vehicle moves forward.

7. A rake having an axle and wheels, a push-off movable forward on the rake, drums having fingers movable into driving engagement with the spokes of said wheels, and cables connected with said push-off and adapted to be wound on said drums by reason of engagement of the drums with the wheels for operation of the push-off by the traction of the wheels.

8. A rake having a wheel, a push-off thereon, a drum means to secure driving engagement of the drum with the wheel, and cable connections between the drum and the push-off for movement of the push-off positively both backward and forward.

9. A rake having a wheel, a push-off on the rake, a drum, means to secure driving engagement of the drum with the wheel, a pair of cable connections between the drum and the push-off for driving the push-off both backward and forward under opposite movements of the rake, said connections being interchangeable for reversal of the movements of the push-off with respect to the directions of the movements of the rake.

10. A rake having carrier wheels, a push-off on the rake, means to be moved into driving engagement with one of the wheels, and a pair of connections between said means and the push-off for driving the push-off both backward and forward, said connections being interchangeable for reversal of the movements of the push-off with respect to those of the rake.

11. A rake having carrier wheels, a push-off on the rake, a drum to be moved into driving engagement with the spokes of one of the wheels, and a connection between the drum and the push-off for driving the latter both backward and forward.

12. A vehicle having carrier wheels, a push-off on the vehicle, a drum movable into driving engagement with the spokes of one of the wheels, and a connection between the drum and the push-off for driving the latter through the medium of the wheel.

13. A vehicle having a carrier wheel, a push-off on the vehicle, means movable into driving engagement with the spokes of the wheel for operating the push-off, and automatically operable means for breaking such engagement.

14. A vehicle, a push-off thereon, a connection for moving the push-off forward, and a second connection for moving the push-off rearward, said connections being interchangeable for reversal of the movements.

15. A rake having guide beams, a push-off having plungers slidable on said beams, and means for moving the push-off forward automatically as the rake moves forward.

16. A rake having a wheel, a push-off on the rake, a driving connection adapted to be brought into position to engage the wheel, means to actuate said connection, and means between the connection and the push-off for driving the push-off through the medium of said wheel by forward movement of the rake when the connection is engaged with said wheel.

17. A rake having a wheel, a push-off thereon, a drum means for producing a driving connection between the drum and the wheel, and cable connections between the drum and the push-off whereby forward movement of the rake drives the push-off forward and rearward movement of the rake drives the push-off rearward.

In testimony whereof, I affix my signature.

JOSEPH H. COPE.